US007004670B2

(12) United States Patent
Chen et al.

(10) Patent No.: US 7,004,670 B2
(45) Date of Patent: Feb. 28, 2006

(54) MANUAL DISCONNECT APPARATUS AND METHOD

(75) Inventors: Weixiong Chen, Elmhurst, NY (US); Leon J. Tate, Nesconset, NY (US)

(73) Assignee: The Chamberlain Group, Inc., Elmhurst, IL (US)

( * ) Notice: Subject to any disclaimer, the term of this patent is extended or adjusted under 35 U.S.C. 154(b) by 270 days.

(21) Appl. No.: 10/154,401

(22) Filed: May 23, 2002

(65) Prior Publication Data

US 2003/0219305 A1 Nov. 27, 2003

(51) Int. Cl.
*F16B 21/00* (2006.01)
*F16B 21/02* (2006.01)

(52) U.S. Cl. .................................... 403/322.3; 49/139

(58) Field of Classification Search ................. 403/83, 403/84, 321, 322.1, 322.3, 322.4, 324, 325; 49/139, 141

See application file for complete search history.

(56) References Cited

U.S. PATENT DOCUMENTS

| | | | | |
|---|---|---|---|---|
| 4,217,064 | A * | 8/1980 | Hogan | 403/33 |
| 4,603,998 | A * | 8/1986 | Bober et al. | 403/322.2 |
| 5,390,571 | A * | 2/1995 | Fox et al. | 81/177.85 |
| 5,855,449 | A * | 1/1999 | Thomas | 403/262 |
| 6,032,329 | A * | 3/2000 | Casali | 16/71 |
| 6,091,217 | A * | 7/2000 | Parsadayan | 318/285 |
| 6,523,910 | B1 * | 2/2003 | Lin | 301/111.06 |
| 6,553,717 | B1 * | 4/2003 | St. John et al. | 49/340 |

* cited by examiner

*Primary Examiner*—Raymond W. Addie
(74) *Attorney, Agent, or Firm*—Fitch, Even, Tabin & Flannery

(57) ABSTRACT

A retrofitable manual disconnect apparatus includes an output shaft engagement member (20) that couples to the output shaft (13) of a powered movable barrier operator (12), a movable barrier engagement member (14) that couples to a movable barrier (11), and a hand-operable engagement mechanism (40) that controls coupling between the above components. In one embodiment, the hand-operable engagement mechanism (40) includes a pivoting handle (44) that cooperates with a biasing member (43) to control the position of a movable pin (41). In particular, the movable pin (41) can be controllable inserted in or removed from a hole (24) in the output shaft engagement member (20) to facilitate an engaged and disengaged state, respectively.

10 Claims, 6 Drawing Sheets

MANUAL DISCONNECT APPARATUS AND METHOD

TECHNICAL FIELD

This invention relates generally to powered movable barriers and powered movable barrier operators.

BACKGROUND

Movable barriers of various kinds are known, as are powered movable barrier operators that serve to selectively move a corresponding movable barrier between, for example, opened and closed positions. When power is unavailable for any reason, such powered movable barrier operators are ordinarily rendered inoperable. In many cases, when the powered movable barrier operator becomes inoperable, the movable barrier itself cannot be opened. This typically results because the operator itself and/or the linkage between the operator and the movable barrier will inherently resist unpowered movement of the movable barrier.

Such a tendency to resist opening when unpowered can present problems. For example, important access/entry points can be blocked, thereby denying exit to individuals seeking safety during an emergency and/or delaying or prohibiting entry of emergency response personnel who might otherwise be able to present needed aid and assistance. As a result, in some instances, prior art solutions have been made to allow certain movable barriers to be opened even when motive power has been lost.

Many such proposals are not entirely adequate to the task. The operative mechanism may be difficult to operate, expensive to implement, or suitable only for initial (as versus retrofitting) installation applications. Further, some prior art proposals may work satisfactorily when the movable barrier is substantially unloaded, but prove difficult or impossible to operate when the corresponding movable barrier is loaded for some reason (as happens, for example, when a swinging gate is pressing upon a stationary vehicle or vice versa). Yet other proposals may prove overly sensitive to environmental factors and/or ordinary wear and tear.

BRIEF DESCRIPTION OF THE DRAWINGS

These needs and others are substantially met through provision of the manual disconnect apparatus and method disclosed herein, and can be better understood and appreciated upon making a thorough review and study of the following detailed description, and particularly when studied in conjunction with the drawings, wherein.

Figure 1:
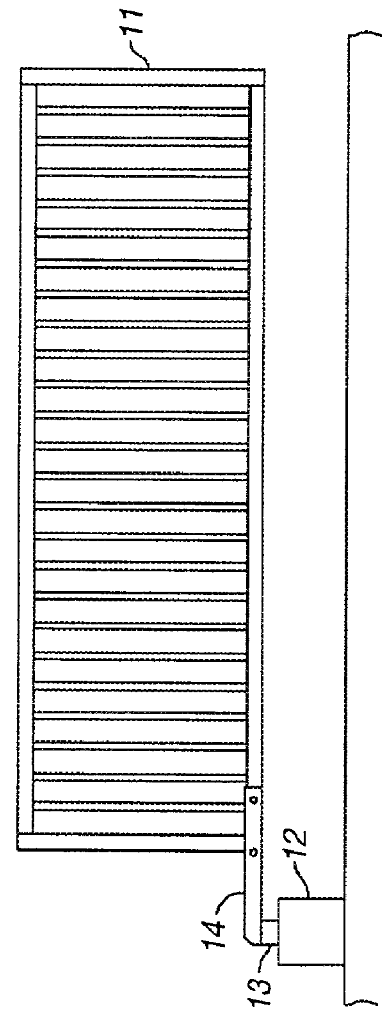
FIG. 1 comprises a front elevational view of a movable barrier as coupled to a powered movable barrier operator as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Pursuant to these various embodiments, a manual disconnect apparatus is suitable for use with a powered movable barrier operator having an output shaft that operably couples to a movable barrier and effects selective movement of the movable barrier. The manual disconnect apparatus itself comprises an output shaft engagement member configured to affix to the output shaft, a movable barrier engagement member configured to affix to the movable barrier, and a hand-operable engagement mechanism that is configured to selectively engage and disengage a mechanically coupled relationship between the output shaft engagement member and the movable barrier engagement member.

In one embodiment, the output shaft engagement member comprises a collar having a cavity axially formed therethrough to snuggly admit the output shaft and another radially disposed cavity that serves to interface with an engagement member to couple or decouple the output shaft to and from the movable barrier. In one embodiment, the radially disposed cavity is inwardly tapered. In addition to other benefits, this tapered surface serves to allow the engagement member to move in and out of the radially disposed cavity to thereby more readily effect engagement and disengagement states. This is particularly helpful when seeking to disengage the output shaft from the movable barrier when the movable barrier is itself in a loaded state through, for example, some additional external force acting thereon.

In one embodiment, the engagement member can be provided through use of a movable pin that is biased towards a disengaged position by, for example, a spring. A hand-operable engagement mechanism, such as a hand-operable pivoting handle, can then be manipulated to urge the movable pin at least partially into the radially disposed cavity in the output shaft engagement member to effect an engaged configuration. A pin contact surface on the handle can be used to physically engage the movable pin, and a guide surface (such as a cam surface) formed in conjunction with the handle can interact with a follower that is affixed with respect to the movable pin to aid in ensuring a desired longitudinal movement of the movable pin with respect to the radially disposed cavity.

So configured, the hand-operable pivoting handle can provide significant mechanical advantage (for example, upwards of a 7 to 1 mechanical advantage) to assure a readily manipulable mechanism by an individual's hand.

In a preferred embodiment, latching mechanisms (such as, for example, detents and detent engagement mechanisms) can be utilized to aid in holding the hand-operable pivoting handle (and the corresponding movable pin) in both the engaged and disengaged positions.

Such a manual disconnect apparatus is highly effective to ensure relatively rapid and easy engagement and disengagement between a movable barrier and a powered movable barrier operator by the hand of a single individual user even when the movable barrier has a force presently exerted thereon by the movable barrier operator itself. The mechanism is relatively simple and durable in use. Further, these embodiments are retrofitable. That is, this apparatus can readily be utilized with existing installed operators and movable barriers.

Referring now to FIG. 1, for purposes of these descriptions the movable barrier 11 will be presumed to be a swinging gate that pivots about a vertical axis. Such gates are well understood in the art and hence no further description will be provided here for the sake of brevity. FIG. 1 also depicts a powered movable barrier operator 12 of known type and configuration and which features a vertically oriented output shaft 13 that is driven by a motor (not shown) of appropriate size within the powered movable barrier operator 12. A movable barrier engagement member 14 serves to couple the output shaft 13 to the movable barrier 11 such that the movable barrier will move (typically through an allowed range of approximately 90 degrees) as the output shaft 13 rotates. In the embodiments described below, a manual disconnect apparatus allows the movable barrier engagement member 14 (and hence the movable barrier 11) to be disengaged from the output shaft 13 such that the movable barrier 11 can be rotated about its pivoting axis without engaging or otherwise being resisted by the powered movable barrier operator 12 via the output shaft 13.

Figure 3:
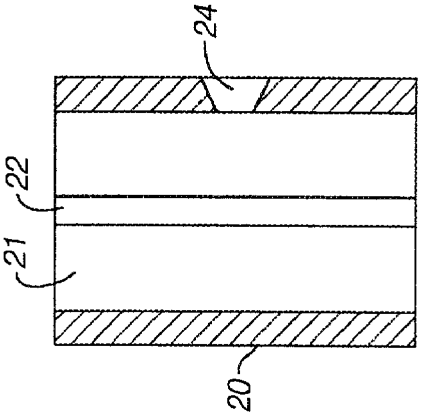
FIG. 3 comprises a sectioned side elevational view of the output shaft engagement member as configured in accordance with an embodiment of the invention.
Figure 2:
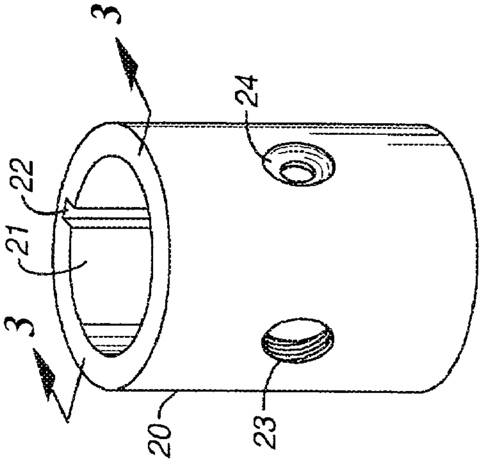
FIG. 2 comprises a perspective view of an output shaft engagement member as configured in accordance with an embodiment of the invention.

Referring now to FIGS. 2 and 3, the manual disconnect apparatus in this embodiment includes an output shaft engagement member 20 comprising, in a preferred embodiment, a hub having a cavity 21 formed axially therethrough. The hub should be comprised of an appropriate material, such as a hardened metal, that can withstand in particular the shear stresses that are placed upon this component during use. The cavity 21 is of appropriate size to fit easily, but somewhat snugly, about the output shaft 13 of the powered movable barrier operator 12. A longitudinal notch 22 can also be formed within the cavity 21 as appropriate to match a corresponding key feature as may be provided on some output shafts 13.

The hub also features a first radially disposed hole 23 disposed therethrough, which hole 23 is threaded to facilitate receiving a set screw (not shown). The set screw is used to hold the hub in place on the output shaft 13 in accordance with well understood prior art technique.

The hub also features a second radially disposed hole 24 disposed therethrough, which hole 24 serves to receive an engagement member (such as a movable pin) as described below in more detail. In one embodiment, this second hole 24 can comprise a cylinder having substantially parallel walls. In a preferred embodiment, however, this second hole 24 is tapered inwardly (as perhaps best shown in FIG. 3). Such tapering better facilitates the ease with which the engagement member described below can be inserted into and withdrawn from the second hole 24 to effect engagement and disengagement states of the apparatus. In particular, this tapering contributes to the ability of this apparatus to function even when the movable barrier is loaded and/or the movable pin and second hole 24 are misaligned for whatever reason. If desired, only a portion of the second hole 24 need be tapered, but in a preferred embodiment the entire length of the cavity comprising the hole 24 is tapered.

Figure 4:
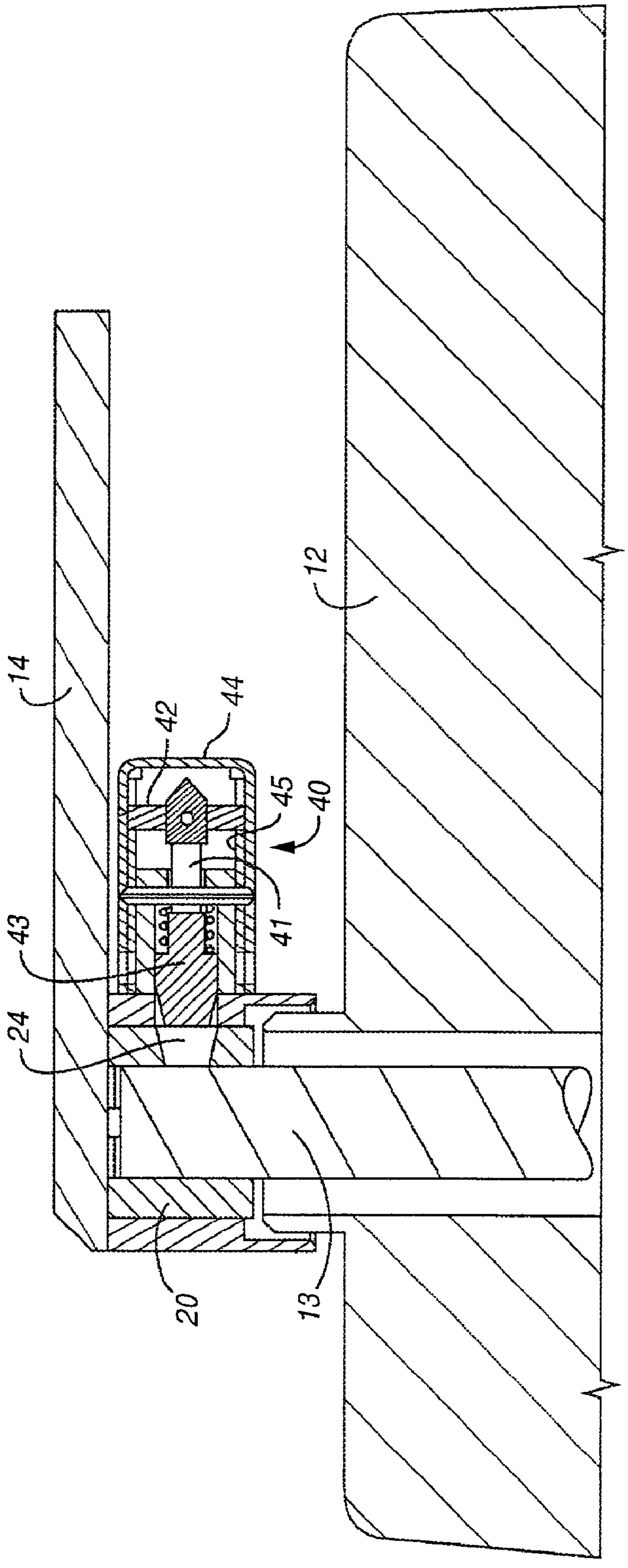
FIG. 4 comprises a side elevational sectioned view of a manual disconnect apparatus as operably coupled to a powered movable barrier operator as configured in accordance with an embodiment of the invention.

Referring now to FIG. 4, the powered movable barrier operator 12, as described earlier, has a vertically oriented output shaft 13 extending therefrom. The output shaft engagement member 20 is disposed about an upper end thereof and preferably secured in place (such as by tightening a set screw as referenced above). The movable barrier engagement member 14 is then rotatably disposed about the output shaft engagement member 20.

The manual disconnect apparatus includes a hand-operable engagement mechanism 40 that generally includes an engagement member comprising a movable pin 41, a follower 42, a bias member 43, and a hand-operable pivoting handle 44.

The movable pin 41 generally comprises a cylindrically-shaped member having a first end that is, in a preferred embodiment, tapered to substantially conform to the corresponding tapered surface in the taper hole 24 of the output shaft engagement member 20. The opposing end of the movable pin 41 comprises a pointed tip that serves to interface with a corresponding contact surface on the pivoting handle 44 as described below in more detail. The follower 42 comprises a rectangular plate that is disposed about the movable pin 41 and serves to aid in ensuring only axial movement of the movable pin 41 through interaction with a guide surface as described below. In this embodiment, the follower 42 is disposed relatively proximal to the pointed tip of the movable pin 41. If desired, and as might be appropriate to other configurations, the follower 42 could be located elsewhere and/or additional followers (or a thicker follower) could be utilized as well. The bias member 43 comprises, in this embodiment, a spring that is disposed about a middle portion of the movable pin 41 (in this embodiment, the spring is stopped at one end by a notched area comprising a stop surface that is formed in the movable pin 41 itself and at the other end by a stop surface having a hole sufficient to admit the movable pin 41 but not the spring). So disposed, the bias member 43 tends to urge the movable pin 41 inwardly towards the tapered hole 24 and hence towards an engaged position.

In this view, the movable pin 41 is depicted in the disengaged position such that the movable pin 41 is fully withdrawn from the tapered hole 24. So positioned, the output shaft engagement member 40 (and hence the movable barrier engagement member 14) can freely rotate with respect to the output shaft engagement member 20. As a result, the movable barrier can be freely moved without requiring concurrent rotation of the output shaft 13, and hence without resistance from the powered movable barrier operator 12. The movable pin 41 is held in this position by the pivoting handle 44. In particular, the pivoting handle 41 has an edge feature 45 that contacts the follower 42 and urges the follower 42 to this disengaged position. So long as the pivoting handle 44 is maintained in this position, the follower 42 is held in position by the edge feature 45 to thereby retain the movable pin 41 in a disengaged position notwithstanding the bias forces of the bias member 43.

Figure 5:
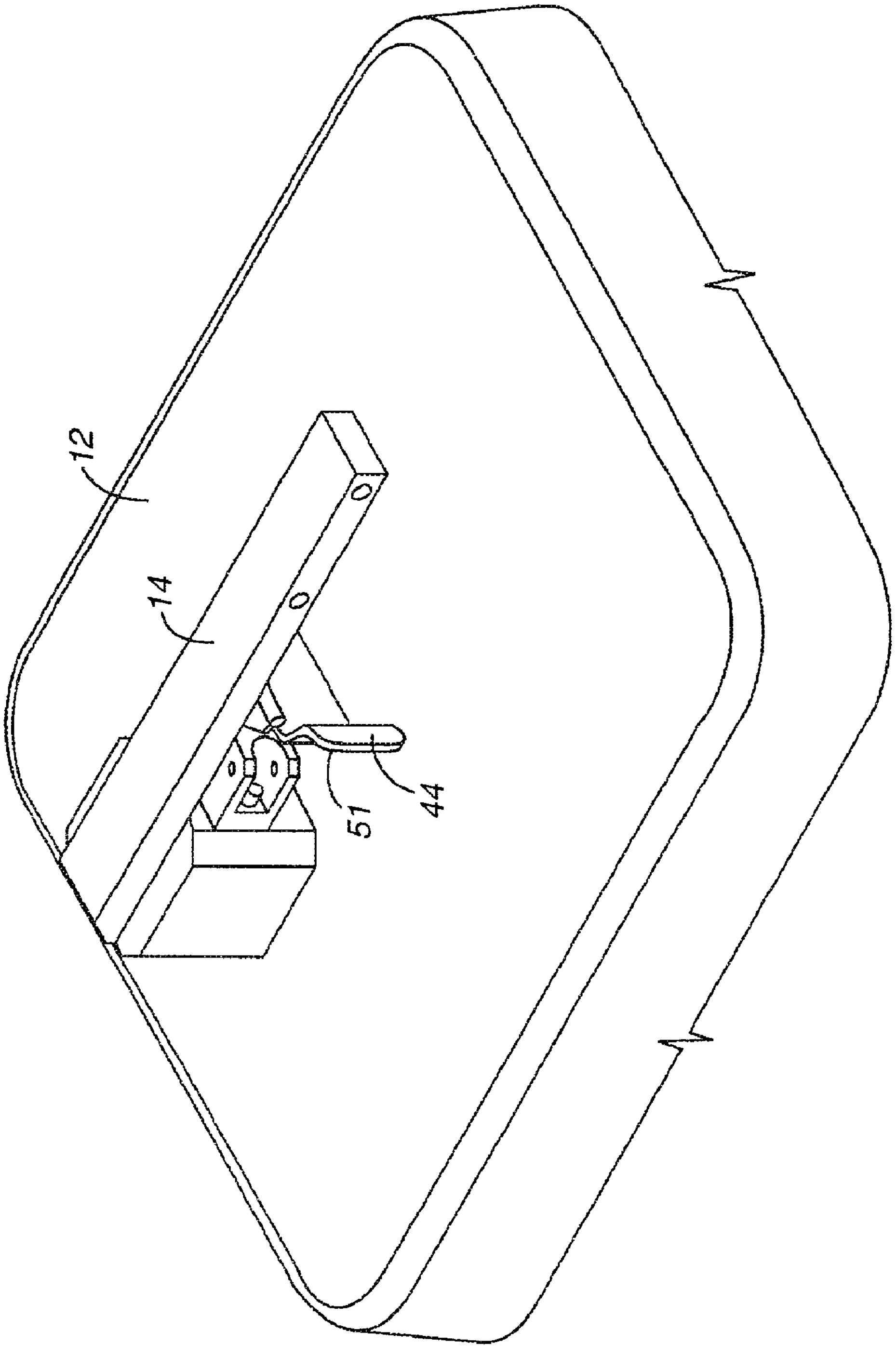
FIG. 5 comprises a top perspective view of a manual disconnect apparatus as operably coupled to a powered movable barrier operator as configured in accordance with an embodiment of the invention.

Referring now to FIG. 5, the pivoting handle 44 is seen from a different vantage point while still positioned in the disengaged orientation as otherwise depicted in FIG. 4. If desired, at least portions of the pivoting handle 44 can be colored a distinct color (such as red) to aid in identifying its relevant functionality. In this embodiment the pivoting handle 44 has a hand-manipulable end 51 that is readily manipulable by a user's hand. Various configurations could of course be provided in this regard. The longer the hand-manipulable end 51, the greater the mechanical advantage offered. With this embodiment, however, even a relatively short hand-manipulable end 51 such as the one depicted will still offer at least a 7 to 1 mechanical advantage with respect to manipulation of the movable pin 41.

Figure 6:
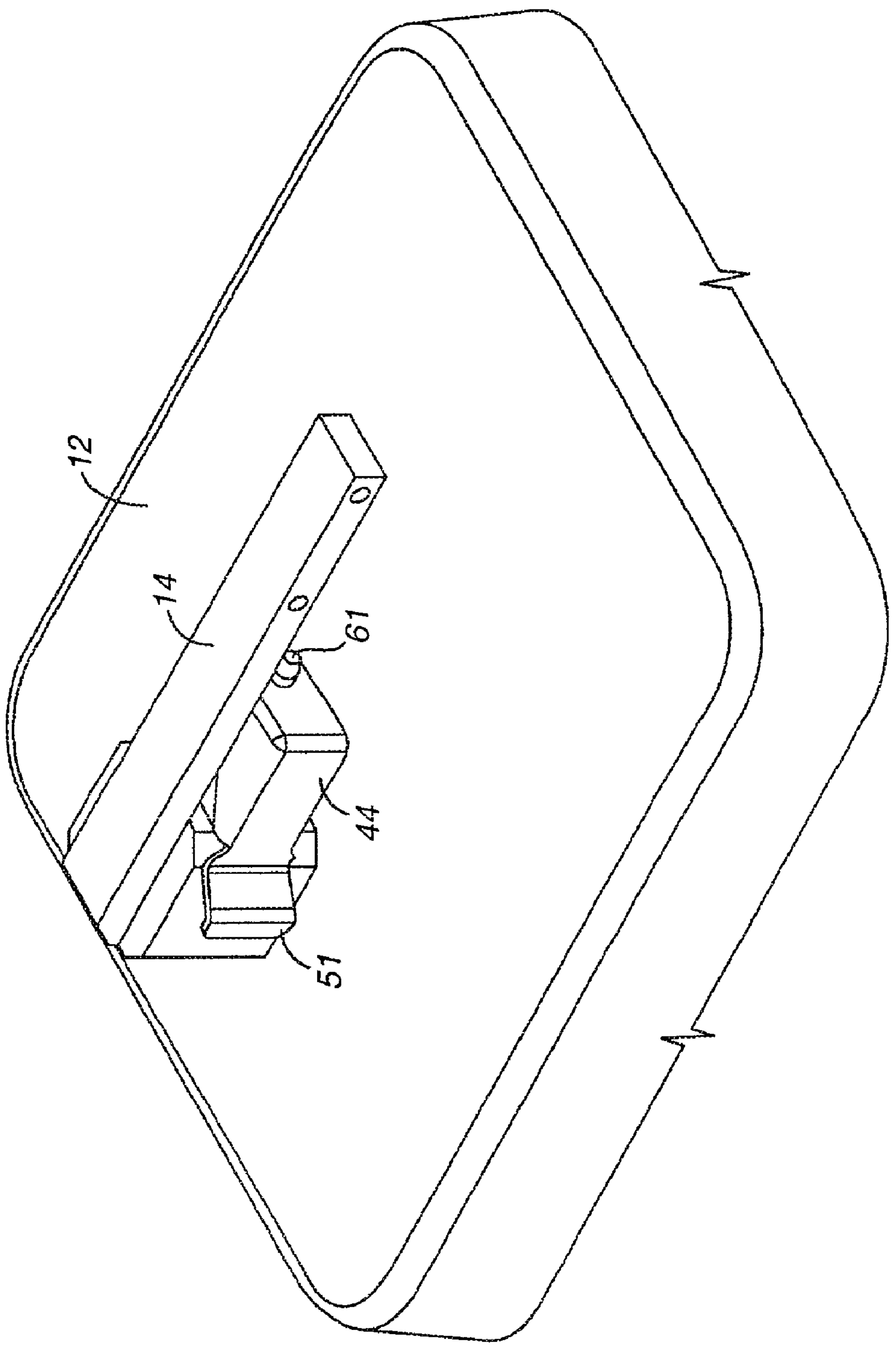
FIG. 6 comprises another top perspective view of a manual disconnect apparatus as operably coupled to a powered movable barrier operator as configured in accordance with an embodiment of the invention.

Referring now to FIG. 6, the pivoting handle 44 is shown in the engaged position. So positioned, with the hand-manipulable end 51 generally urged towards the output shaft, and as will be depicted below in more detail, the movable pin 41 is urged into and disposed within the tapered hole 24 in the output shaft engagement member 20. This view also depicts a control surface 61 for a corresponding adjustable stop surface (comprised of a set screw in this embodiment) that can be used, as described below, to control with considerable resolution the interaction between the movable pin 41 and the pivoting handle contact surface. By rotating the control surface, the relative position of the contact surface can be moved either towards or away from the movable pin 41. This control facility ensures that the movable pin 41 can be appropriately placed within the taper hole 24 during engagement and fully withdrawn therefrom during disengagement.

Figure 8:
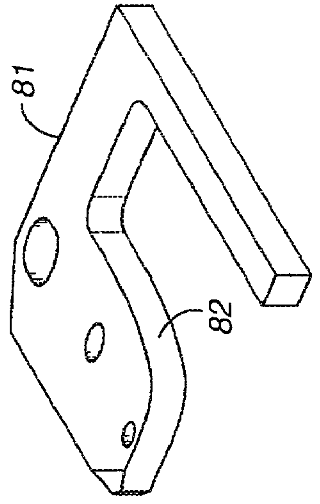
FIG. 8 comprises a top perspective view of a guide surface as configured in accordance with an embodiment of the invention.
Figure 7:
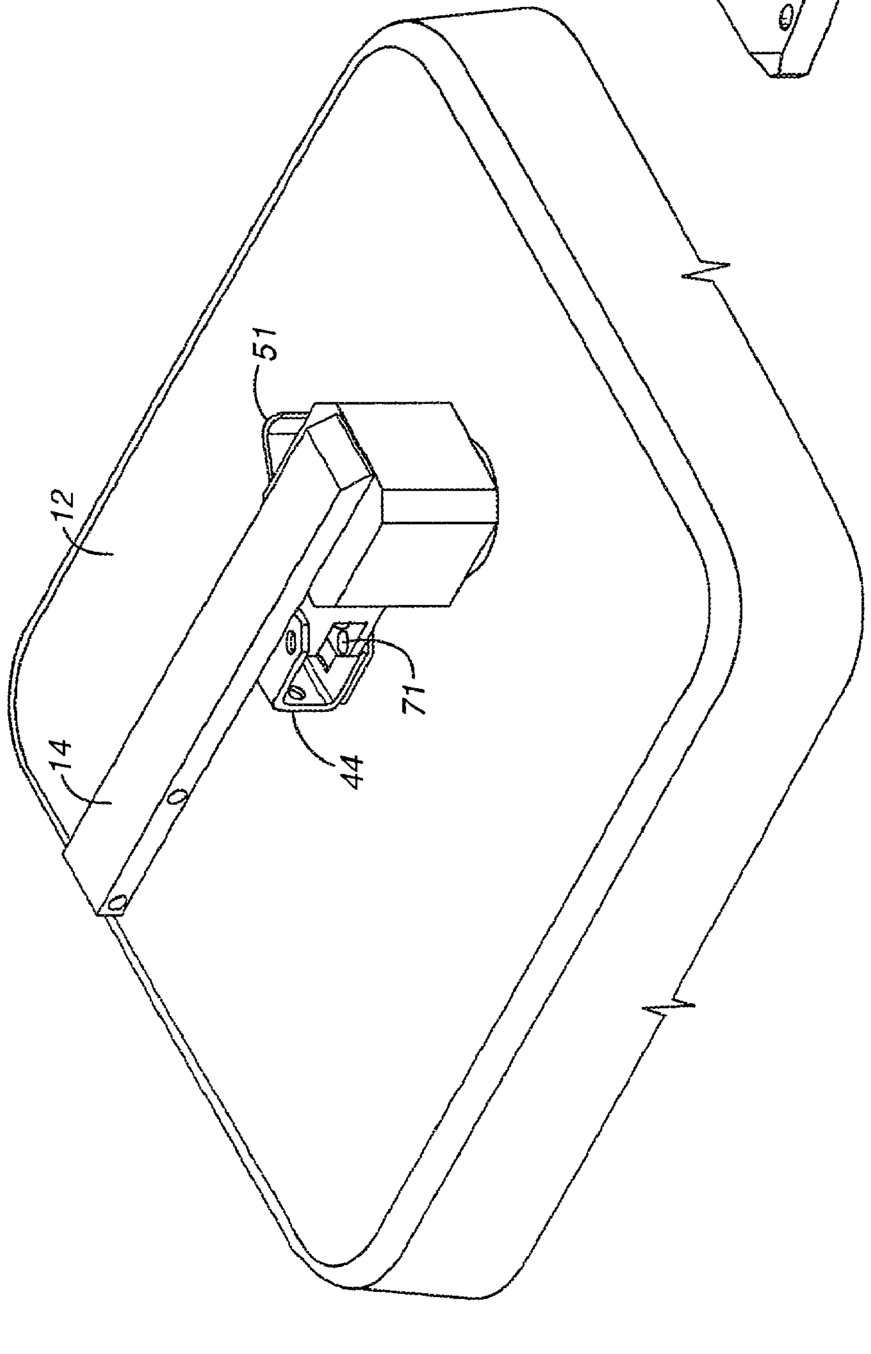
FIG. 7 comprises a top perspective view (from another angle) of a manual disconnect apparatus as operably coupled to a powered movable barrier operator as configured in accordance with an embodiment of the invention.

As already mentioned, the pivoting handle 44 rotates about a vertical pivot axis. Referring now to FIG. 7, this vertical pivot axis 71 is more readily viewed (as depicted in this figure, the pivoting handle 44 is in the engaged position such that the hand-manipulable end 51 is positioned proximal the output shaft). As also already mentioned, the follower 42 as coupled to the movable pin 41 interacts with a guide surface. FIG. 8 presents a top perspective view of the guide surface 81 which presents a curved cam surface 82 that serves to guide the follower 42 as the pivoting handle 44 is pivoted about its axis 71. Although the cam surface 82 is curved, the follower 42 (and hence the movable pivot 41) does not itself move in a curved fashion. Instead, as the pivoting handle 44 pivots about its axis, this curved cam surface 82 instead ensures that the follower 42 and hence the movable pin 41 move only in an axial direction.

Figure 9:
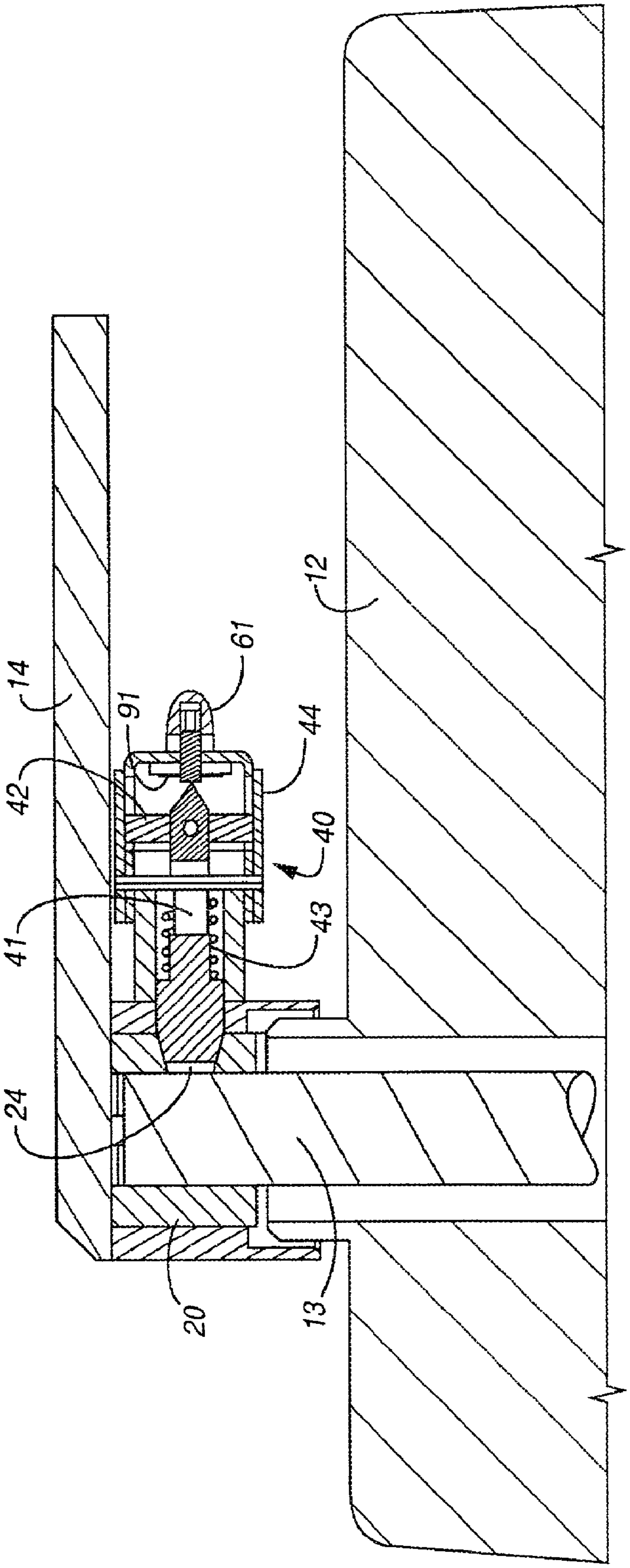
FIG. 9 comprises yet another side elevational sectioned view of a manual disconnect apparatus as operably coupled to a powered movable barrier operator as configured in accordance with an embodiment of the invention.

FIG. 9 presents a useful view for understanding the engaged position of the pivoting handle 44 and the movable pin 41. With the pivoting handle 44 in the engaged position, a contact surface 91 disposed on an interior surface thereof is brought into contact with the pointed end of the movable pin 41. So oriented, the output shaft engagement member 40 (and hence the movable barrier engagement member 14) cannot be rotated without also necessitating rotation of the output shaft engagement member 20 (and hence the output shaft 13). Conversely, when the output shaft 13 is moved by the powered movable barrier operator 12, the output shaft engagement member 40 (along with the movable barrier engagement member 14) will also move in lock-step therewith, thereby facilitating proper powered movement of the corresponding movable barrier.

So configured, the output shaft engagement member 20 can be readily coupled to a powered movable barrier operator shaft 13 (this includes retrofitting this member 20 to a previously installed and utilized movable barrier operator output shaft 13). Similarly, the movable barrier engagement member 14 can be readily coupled to a movable barrier, including a swinging gate (this also includes retrofitting the engagement member 14 to a previously installed and utilized movable barrier). Simple hand manipulation of the output shaft engagement member 40 then permits controlled engagement and disengagement of the movable barrier engagement member 14 to and from the output shaft engagement member 20.

If desired, and in a preferred embodiment, a latching mechanism such as detents and detent engaging mechanisms as well understood in the art can be used to secure the pivoting handle 44 when in the engaged position, the disengaged position, or both. Such latching mechanisms, when used, should be secure enough to retain the pivoting handle 44 in place against the ordinary forces acting thereon but loose enough to still permit relative ease of hand manipulation of the pivoting handle 44 without need for special tools or other assistance.

The manual disconnect apparatus as described through the various embodiments presented above provides a simple, effective, relatively inexpensive mechanism for securely engaging the output shaft of a powered movable barrier operator to a movable barrier while simultaneously facilitating relatively easy disengagement to allow the movable barrier to be moved by hand when such an action is desired. The tapered hole and movable pin of the preferred embodiment allow the mechanism to be moved to an engaged position even when the individual elements are not precisely aligned in the first instance and further allows the disengaged position to be attained even when the movable barrier is loaded by, for instance, one or more forces acting normally against the movable barrier. Positioning of the movable pin can be controlled with considerable precision to ensure a tight fit when engaged. Furthermore, all of the above benefits can be attained in a fully retrofitable configuration.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A manual disconnect apparatus for use with a powered movable barrier operator having an output shaft that operably couples to a movable barrier to effect selective movement of the movable barrier, comprising:

an output shaft engagement member configured to affix to the output shaft;

a movable barrier engagement member configured to affix to the movable barrier;

a hand-operable engagement mechanism comprising:

a hand-operable pivoting handle configured to selectively engage and disengage a mechanically coupled relationship between the output shaft engagement member and the movable barrier engagement member wherein the hand-operable pivoting handle is hand-movable between an engaged and disengaged position;

an engagement member that is biased towards the hand-operable pivoting handle and which engagement member is at least partially disposed within a cavity in the output shaft engagement member when the hand-operable pivoting handle is in the engaged position and that is withdrawn from the cavity in the output shaft engagement member when the hand-operable pivoting handle is in the disengaged position;

a spring that biases the engagement member towards the hand-operated pivoting handle;

a guide surface; and a follower affixed with respect to the engagement member and being operably disposed in cooperative relationship with the guide surface.

2. The manual disconnect apparatus of claim 1 wherein the guide surface comprises, at least in part, a cam surface.

3. The manual disconnect apparatus of claim 1 wherein the hand-operable engagement mechanism further includes a latching mechanism.

4. A manual disconnect apparatus for use with a powered movable barrier operator having an output shaft that operably couples to a movable barrier to effect selective movement of the movable barrier, comprising:

an output shaft engagement member configured to affix to the output shaft;

a movable barrier engagement member configured to affix to the movable barrier;

a hand-operable engagement mechanism comprising:

a hand-operable pivoting handle configured to selectively engage and disengage a mechanically coupled relationship between the output shaft engagement member and the movable barrier engagement member wherein the hand-operable pivoting handle is hand-movable between an engaged and disengaged position, wherein the hand-operable pivoting handle provides at least a 4 to 1 mechanical advantage with respect to movement of the engagement member with respect to the output shaft engagement member; and an engagement member that is biased towards the hand-operable pivoting handle and which engagement member is at least partially disposed within the cavity in the output shaft engagement member when the hand-operable pivoting handle is in the engaged position and that is withdrawn from the cavity in the output shaft engagement member when the hand-operable pivoting handle is in the disengaged position.

5. The manual disconnect apparatus of claim 4 wherein the hand-operable pivoting handle provides at least a 7 to 1 mechanical advantage with respect to movement of the engagement member with respect to the output shaft engagement member.

6. The manual disconnect apparatus of claim 3 wherein the latching mechanism is automatically engaged when the hand-operated pivoting handle is in the engaged position.

7. The manual disconnect apparatus of claim 6 wherein the latching mechanism includes a detent engagement mechanism.

8. The manual disconnect apparatus of claim 4 wherein the hand-operable engagement mechanism further includes a latching mechanism.

9. The manual disconnect apparatus of claim 8 wherein the latching mechanism is automatically engaged when the hand-operated pivoting handle is in the engaged position.

10. The manual disconnect apparatus of claim 9 wherein the latching mechanism includes a detent engagement mechanism.

* * * * *